United States Patent

[11] 3,622,163

[72] Inventor William S. Bachman
Southport, Conn.

[21] Appl. No. 878,811
[22] Filed Nov. 21, 1969
[45] Patented Nov. 23, 1971
[73] Assignee Columbia Broadcasting System, Inc.

[54] PHONOGRAPH RECORD PLAYER
10 Claims, 11 Drawing Figs.

[52] U.S. Cl. ........ 274/13 R, 274/23 A
[51] Int. Cl. ........ G11b 3/10, G11b 17/06
[50] Field of Search ........ 274/23 A, 23 R, 13 R

[56] References Cited

UNITED STATES PATENTS

| | | | |
|---|---|---|---|
| 2,350,490 | 6/1944 | Berliner | 274/13 R |
| 2,915,315 | 12/1959 | Rabinow | 274/23 A |
| 3,249,362 | 5/1966 | Rabinow | 274/23 A |
| 3,363,909 | 1/1968 | Kozu et al. | 274/23 A |

*Primary Examiner*—Leonard Forman
*Assistant Examiner*—Steven L. Stephan
*Attorney*—Spencer E. Olson

ABSTRACT: A record player has a phonograph pickup mounted directly on a carriage which is adapted to be propelled radially across a record by drive means including a half-nut on the carriage engageable with an eccentric lead screw. In the event the speed of the carriage differs from the speed of advancement of the pickup stylus, positional disagreement between the pickup and the carriage occurs which is sensed mechanically and acts to disable the carriage drive temporarily to permit the pickup stylus to catch up. In this fashion, the stylus is maintained substantially tangent to the record groove at all times without exerting side pressure on the record groove. So called "fast" runoff grooves at the end of the record cause the stylus to move faster than the carriage. The resulting positional disagreement between the carriage and the stylus is sensed mechanically and actuates mechanism to lift the stylus automatically from the record when playback is completed.

INVENTOR.
WILLIAM S. BACHMAN
BY Spencer E. Olson
his ATTORNEY.

INVENTOR.
WILLIAM S. BACHMAN
BY [signature]
his ATTORNEY.

INVENTOR.
WILLIAM S. BACHMAN

BY Spencer E. Olson his ATTORNEY.

INVENTOR.
WILLIAM S. BACHMAN
BY Spencer E. Olson
his ATTORNEY.

INVENTOR.
WILLIAM S. BACHMAN
BY [signature]
his ATTORNEY.

PHONOGRAPH RECORD PLAYER

BACKGROUND OF THE INVENTION

This invention relates to phonograph record players. In particular, it relates to a phonograph record player including a pickup having a stylus which is adapted to be advanced radially across a disc record during playback.

The conventional record player pickup carried by a tone arm pivotally mounted at a point on the turntable base is in effect, a free body in space supported by a spring. The resonance between the effective mass of the pickup and arm and the suspension compliance is of very high "Q" and is usually placed below the desired audio range to be reproduced. While this does not upset the frequency response, it can give rise to undesirable cross modulation and amplifier overload, since any transient, whether applied externally or through the groove modulation, will excite this resonance. Moreover, with a pivoted tone arm, the stylus is not tangent to the groove during much of the playback operation so that tracking distortion and undesirable biases on the stylus are present.

Attempts have been made to solve the tangency problem by mounting the pivoted end of the tone arm on a carriage adapted to be translated along a path parallel to a record radius and utilizing a servosystem responsive to the change in angle between the tone arm and the carriage to drive the latter at a speed to maintain the stylus substantially tangent to the record groove at all times. While some improvement in operation can be achieved with such schemes, they have not been satisfactory because they have been complex and delicate and, in some cases, have utilized switch contacts that have introduced noise into sound systems with which they have been used. Further, they are as vulnerable to resonance problems as any other system using a pickup at the end of a tone arm.

SUMMARY OF THE INVENTION

It is an object of the invention to provide new and improved record player apparatus in which resonance between the pickup mass and the suspension compliance is effectively eliminated.

A further object of the invention is to provide an extremely stable record player which is capable of excellent reproduction even when played under conditions of violent vibration and/or tilt;

Another object of the present invention is to provide a record player in which the stylus is always maintained substantially tangent to the record grooves during playback;

Still another object of the present invention is to provide a record player in which the burden of propelling the pickup is removed from the stylus as it engages with successive record grooves;

Still another object of the invention is to provide a record player in which the stylus is automatically lifted from the record when playback is completed.

The above and other objects are attained in accordance with the invention by doing away with the conventional tone arm completely and mounting the reproducing pickup directly on a carriage capable of translation over the turntable parallel to a radius thereof with the pickup stylus always substantially tangent to the record groove. Translation of the carriage is adapted to be effected by a half-nut thereon engageable with an eccentric lead screw preferably driven by the turntable which carries the record to be played. Desirably, the carriage is advanced across the record at a speed slightly higher than the speed of advancement of the stylus by the record groove.

The pickup is so mounted on the carriage as to allow limited relative displacement between the two and simple mechanical means is provided for sensing such displacement. When the displacement exceeds a predetermined value, means is actuated for temporarily disabling the coupling between the half-nut and the lead screw so as to permit the stylus to catch up and thus maintain the lateral displacement between the carriage and the pickup below the predetermined value. In this fashion, the pickup is driven by the motive means with the stylus always substantially tangent to the record groove.

In one embodiment of the invention, the pickup is pivotally mounted on the carriage for limited lateral movement relatively thereto along a record radius. Also, means is provided for rotating the pickup in its pivotal mounting to lift the stylus from the record. The pickup carries a highly complaint sensing member which, at a predetermined lateral displacement between the pickup and the carriage, resulting from the carriage getting ahead of the stylus, maintains the half-nut temporarily disengaged from the lead screw, thus enabling the stylus to catch up with the carriage.

In another embodiment, the pickup may be mounted on the carriage for limited relative movement about an axis perpendicular to the record. The relative movement is sensed and acts in the manner similar to that described above to disable the carriage drive temporarily to allow the stylus to catch up.

Means is also provided according to the invention for automatically lifting the stylus from the record when the end of the record is reached.

BRIEF DESCRIPTION OF THE DRAWINGS

For a better understanding of the present invention, reference may be made to the accompanying drawings in which.

DESCRIPTION OF A PREFERRED EMBODIMENT

Figure 1:
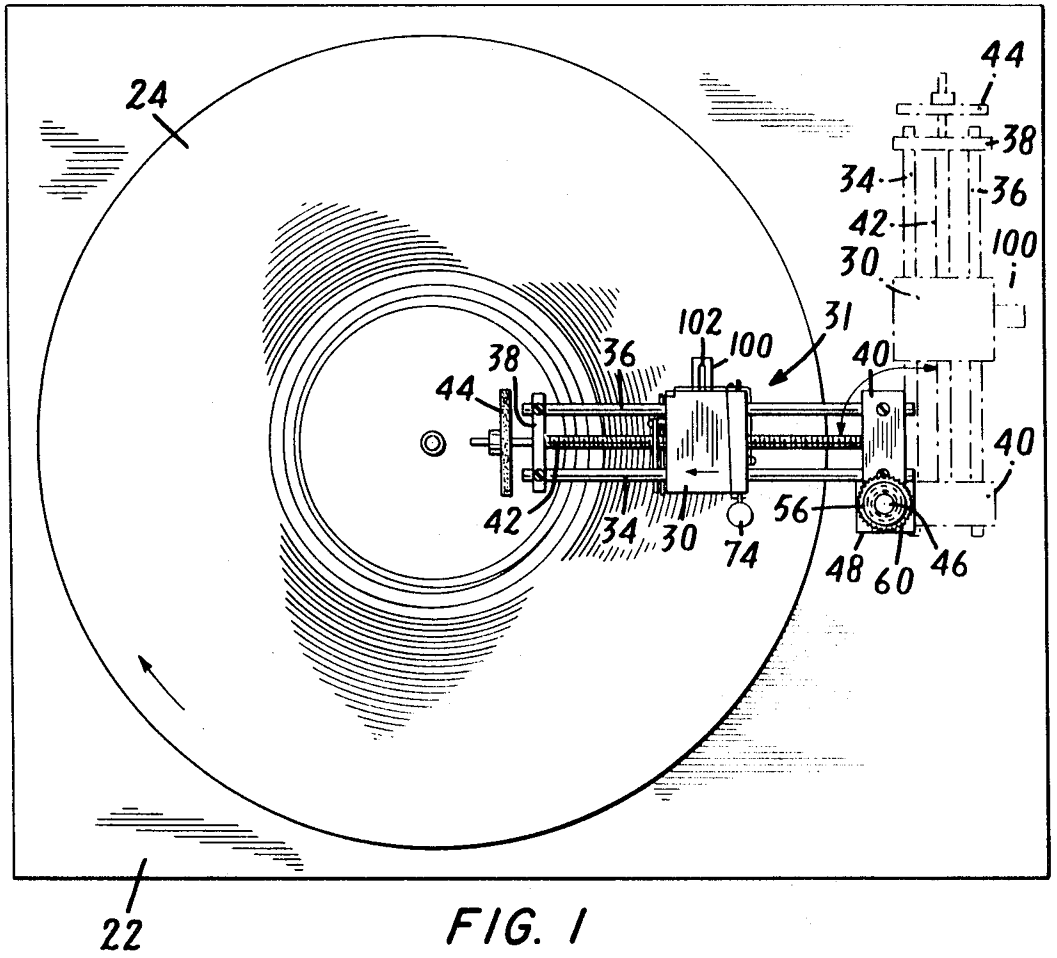
FIG. 1 is a plan view of one form of record player in accordance with the invention.

The record player shown in the drawings for purposes of illustration comprises a conventional turntable 20 (FIGS. 1 and 2) which is rotatably mounted on a base 22 in the usual manner. A conventional disc record 24 is shown on the turntable in the position for playback. A phonograph pickup 26 having a stylus 28 is mounted on a carriage 30 which is adapted to be propelled radially across the record during playback by means to be described in greater detail below. The pickup 26 is connected by wires 32 (FIG. 4) to an amplifier (not shown) for amplification of the reproduced signals.

The carriage 30 is slidably mounted on two spaced, parallel guide rods 34 and 36 the opposite ends of which are secured to clamping members 38 and 40. The carriage 30 is adapted to be driven by an eccentric lead screw 42 which lies between the guide rods 34 and 36 and is journaled at its opposite ends in the clamping members 38 and 40. Fastened to an extension of the screw 42 at a location beyond the clamping member 38 is a friction roller 44 which is adapted to rest on the record 24 for rotation thereby to drive the lead screw 42.

An upright rod 46 (FIGS. 1 and 2) is secured in a block 48 fastened to the base 22. Slidably mounted on the rod 46 is a cylindrical member 50 which is secured to the clamping member 40. The rod 46 has a key 52 at its lower end which engages a keyway 54 formed in the cylindrical member 50 so as to permit the carriage assembly 31 including the clamping members 38 and 40 and the guide rods 34 and 36 to be raised or lowered only when the center line of the lead screw 42 is parallel to a radius of the turntable 20. The cylindrical member 50 is slidable on a tubular member 56 secured to the top of the rod 46 and is normally urged downwardly by a compression spring 58 which tends to urge the cylindrical member 50 and the tubular member 56 apart.

Figure 2:
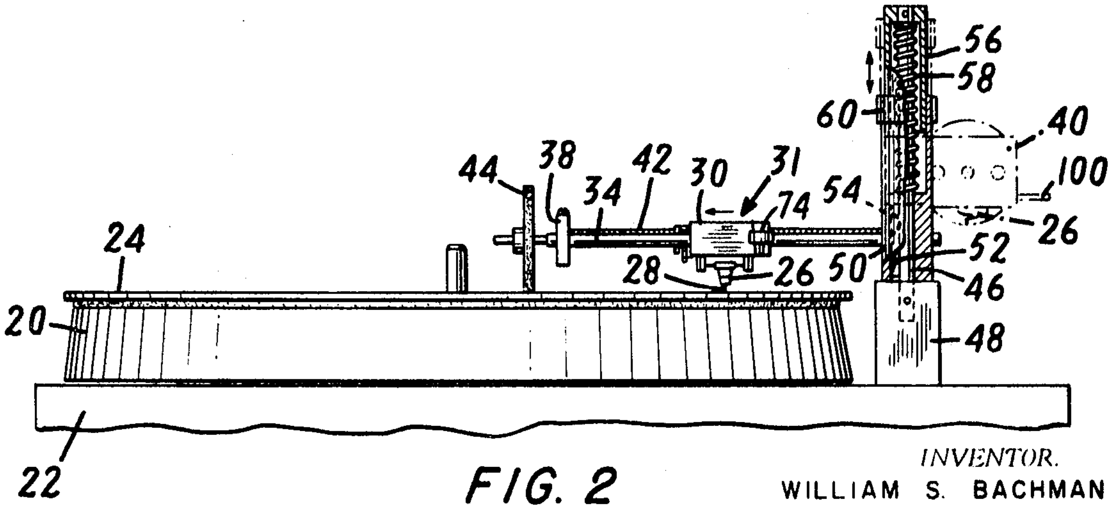
FIG. 2 is an elevational view of the record player shown in FIG. 1.

The cylindrical member 50 has a knurled ring 60 at its upper end which can be grasped to raise it and the carriage assembly 31 from the record until the key 52 is disengaged from the keyway 54, and then to rotate the carriage assembly 31 to the dotted line position shown in FIGS. 1 and 2. The assembly will then remain in this raised position until it is desired to return it to the playing position shown in full lines in FIGS. 1 and 2.

When the assembly 31 is at rest over a record radius, the friction roller 44 at the end of the lead screw 42 engages the record label, and the stylus 28 engages the groove in the record 24 on the turntable 20.

Figures 3, 4:
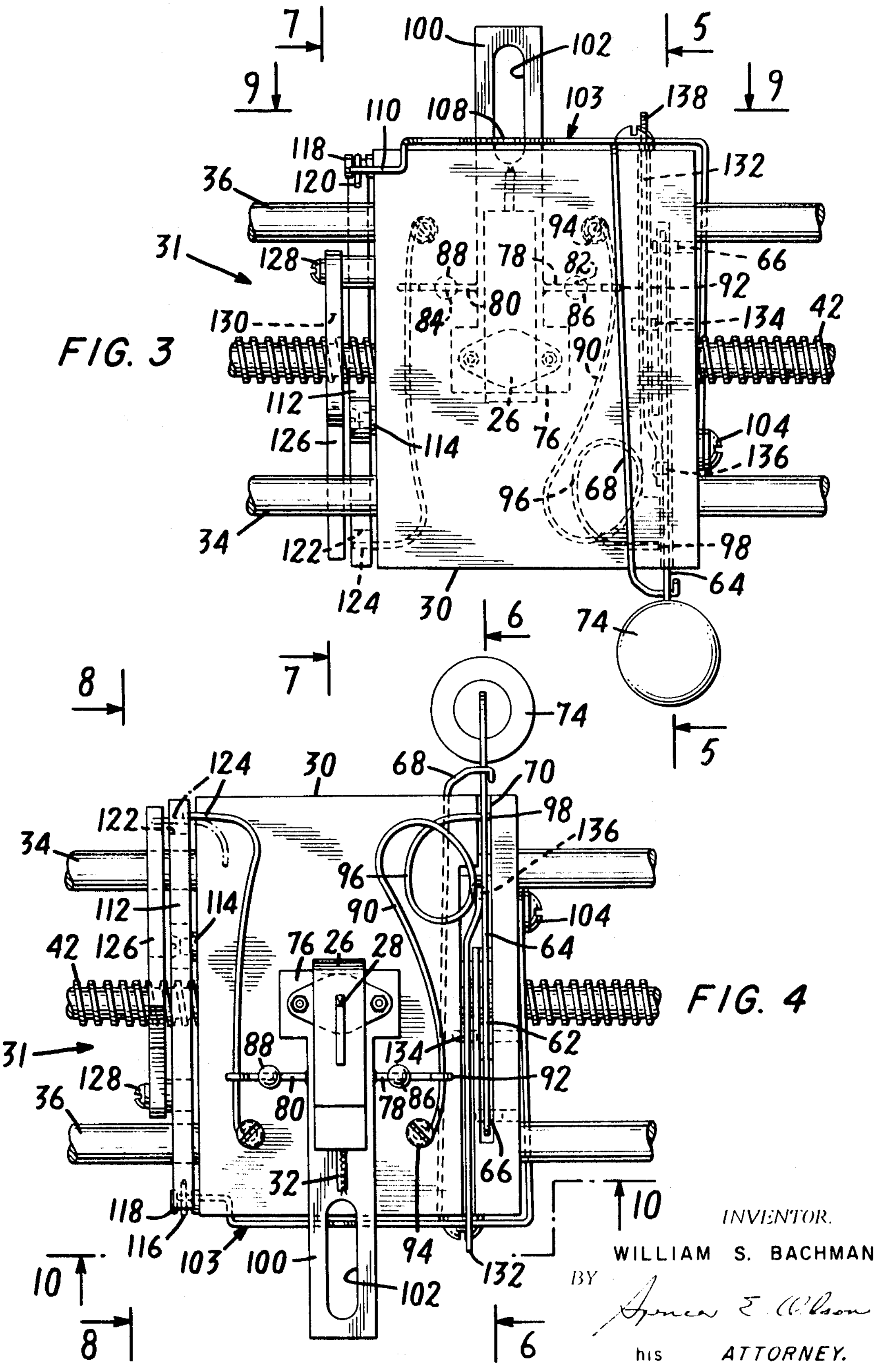
FIG. 3 is an enlarged top plan view of a portion of the record player of FIG. 1 showing the carriage and the pickup when the stylus is tangent to the record grooves.
FIG. 4 is an enlarged bottom plan view of a portion of the record player of FIG. 1 showing relative positions of the carriage and the pickup at which the carriage drive drive is disabled to permit the stylus to catch up.
Figure 5:
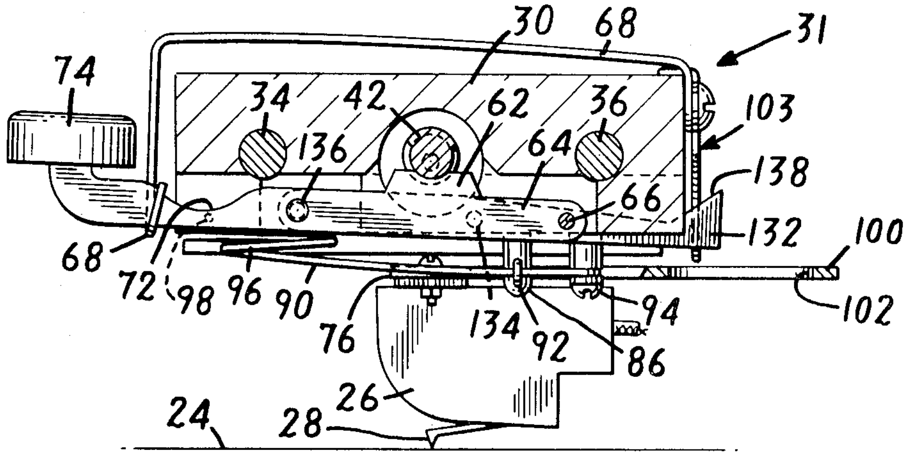
FIG. 5 is a cross-sectional view of a portion of the record player taken along the line 5—5 of FIG. 3, looking in the direction of the arrows.
Figure 6:
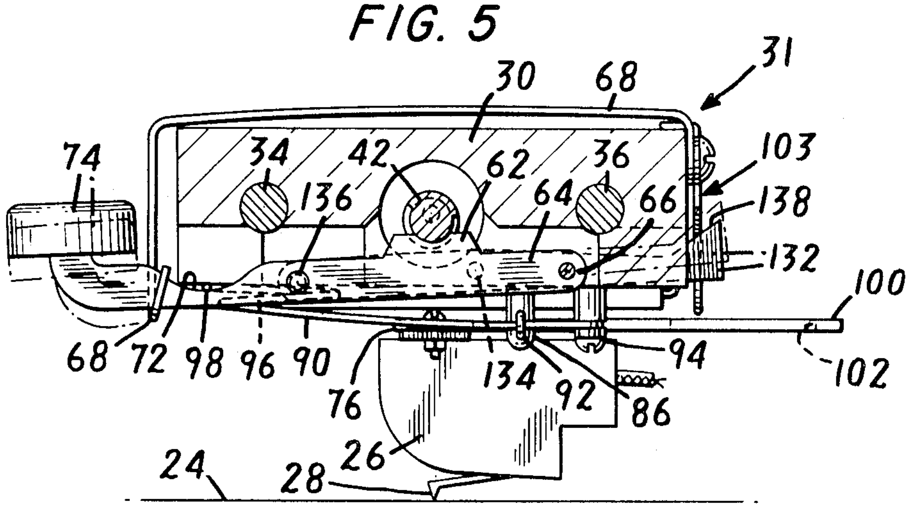
FIG. 6 is a cross-sectional view of a portion of the record player taken along the line 6—6 of FIG. 4 and looking in the direction of the arrows.
Figure 7:
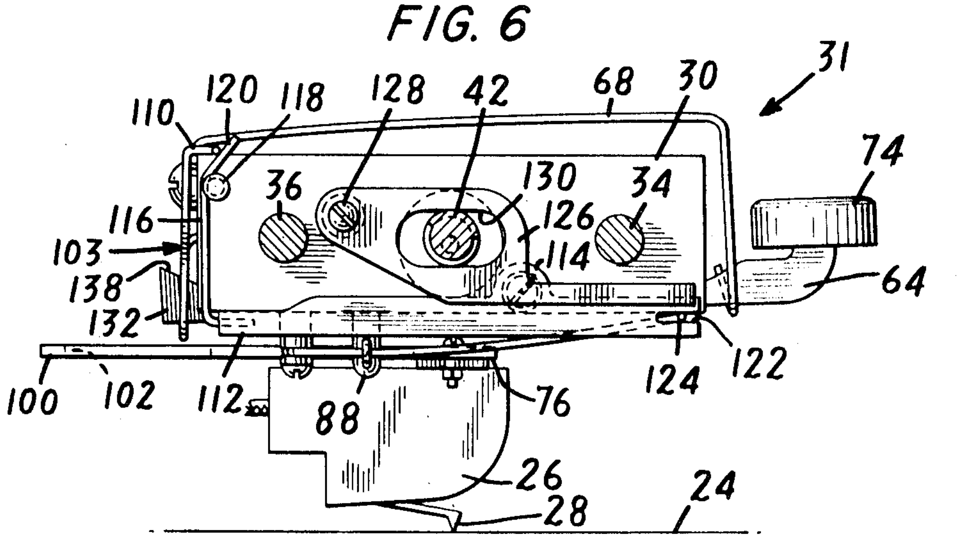
FIG. 7 is a cross-sectional view of a portion of the record player taken along the line 7—7 of FIG. 3, looking in the direction of the arrows.

Referring now to FIGS. 3–5, inclusive, the carriage 30 is adapted to be driven by the lead screw 42 through a coupling including a half-nut 62 formed on an arm 64 pivoted at 66. A spring 68 normally urges the arm 64 through a slot 70 (FIG. 4) to maintain the half-nut 66 engaged with the lead screw 42. A concavity 72 (FIG. 5) formed in the upper surface of the arm 64, near its free end, extends below the bottom surface of the carriage 30 during part of each eccentric rotation of the lead screw 42, and is completely within the slot 70 during another part of each rotation of the lead screw. The arm 64 is provided with an actuator button 74 which can be manually depressed to enable the half-nut 62 to be disengaged from the lead screw 42 to disable the carriage drive when desired.

The phonograph pickup 26 is secured to the under, flat side of a support member 76 which is mounted for pivoting motion to move the stylus 28 towards and away from the record 24. To this end, the member has oppositely directed lateral pivots 78 and 80 extending through bores 82 and 84 formed in downwardly depending supports 86 and 88, respectively, secured to the underside of the carriage 30. The spacing between the supports 86 and 88 is made somewhat greater than the width of the member 76 so as to permit restricted lateral movement of the pickup 26 in addition to turning movement about the pivots 78 and 80. It will be observed that, contrary to conventional practice, no tone arm is used; instead, the pickup is mounted directly on the carriage 30.

The pivot 78 is coupled to a sensing member 90 in such fashion as to transmit to the latter only lateral motion of the pickup 26 while permitting the pickup 26 to be turned about the pivots 78 and 80 as required to lift the stylus 28 from the record and replace it thereon. To this end, the pivot 78 may terminate in an eye 92 through which the sensing member 90 passes. The sensing member 90 may be a fine wire fastened to the underside of the carriage for free, limited rotation about a pivot 94 in response to lateral motion imparted to it by the pivot 82. The wire comprising the sensing member 90 is formed as a coil 96 at its free end and terminates in a tip 98 directed laterally towards the split-nut arm 64 near the concavity 72 formed therein (FIG. 4).

Normally, the tip 98 of the sensing member is close to, but spaced apart from, the concavity 72 in the split-nut arm 64 as the carriage 30 is driven across the record 24 by the lead screw 38. If the carriage speed is greater than the speed of the stylus 28 in the record groove, there will be relative lateral motion between the carriage 30 and the pickup support 76 so that the pivot 78 will move the sensing member 90 until its tip 98 passes between the split-nut arm 64 and the carriage 30. This will hold the split-nut 62 out of engagement with the lead screw 42 during approximately half of each revolution of the lead screw permitting the thread to advance without advancing the split-nut until the stylus 28 catches up with the carriage 30, at which time the sensing member 90 will have returned to its initial position so that the carriage drive is resumed.

Means are also provided, according to the invention, for automatically lifting the stylus 28 from the record at the end of playback in response to fast lateral movement of the stylus in the widely spaced "fast" grooves usually formed adjacent the record label.

Figure 9:
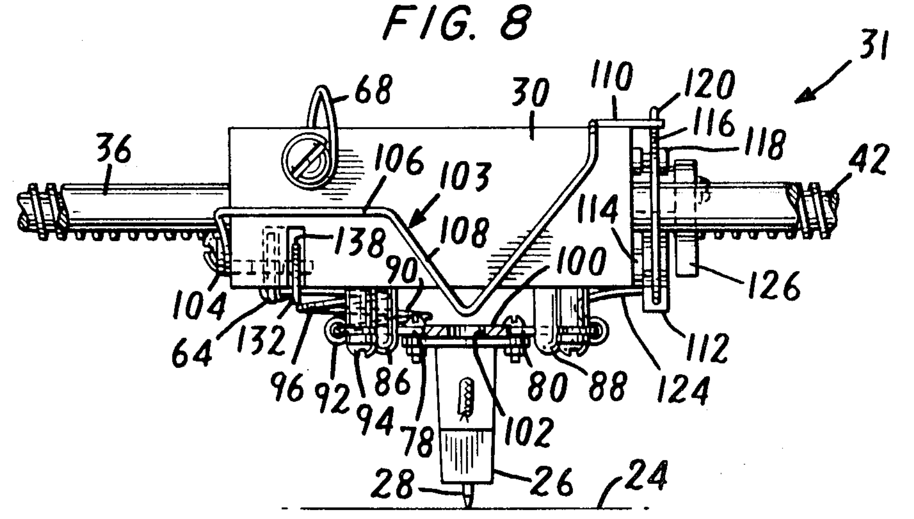
FIG. 9 is a cross-sectional view of a portion of the record player taken along the line 9—9 of FIG. 3, looking in the direction of the arrows.
Figure 10:
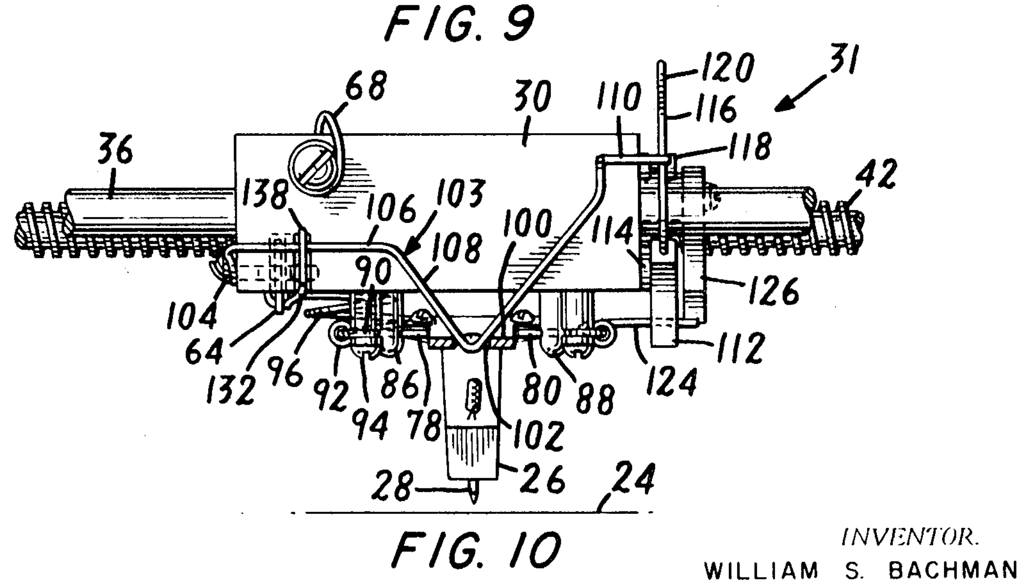
FIG. 10 is a cross-sectional view of a portion of the record player taken along the line 10—10 of FIG. 4, looking in the direction of the arrows.

For lifting the stylus 28 from the record, the pickup support member 76 is provided with a rearwardly extending actuator arm 100 having an elongated slot 102 formed therein extending beyond the edge of the carriage 30, as best shown in FIG. 4. The arm 100 is adapted to be depressed to lift the pickup 26 and its stylus 28 by the action of a spring 103 (shown most completely in FIGS. 9 and 10) which is fastened to the carriage at 104 and has a straight horizontal portion 106, a vertex portion 108 directly above the slot 102 in the arm 100, and a detent portion 110 adapted to be hooked over the top of the carriage 30 to retain it in the normal position shown in FIG. 9. Mechanism is provided as described below for automatically disengaging the spring detent portion 110 from the carriage at the end of playback to permit the spring vertex portion 108 to depress the arm 100 as shown in FIG. 10 to raise the stylus 28 from the record.

Disengagement of the spring detent portion 110 is adapted to be effected by a member 112 (FIG. 8) pivotally mounted on one side of the carriage at 114. At one end of the member is secured an upwardly extending wire 116 which passes over a bearing post 118 and terminates in a forwardly bent portion 120. Formed in the other end of the member 112 is a longitudinally extending slot 122 in which a second sensing wire 124 also actuated by movement of the pickup in its support member is adapted to be received to couple the member 112 to one end of a Scotch yoke 126. The Scotch yoke 126 is pivoted on the carriage at 128, has an elongated slot 130 in which the lead screw 42 is adapted to be snugly received, and its free end is adapted to be swept past the adjacent slot 122 in the member 112 as the yoke 126 is oscillated by rotation of the eccentric lead screw 42.

Figure 8:
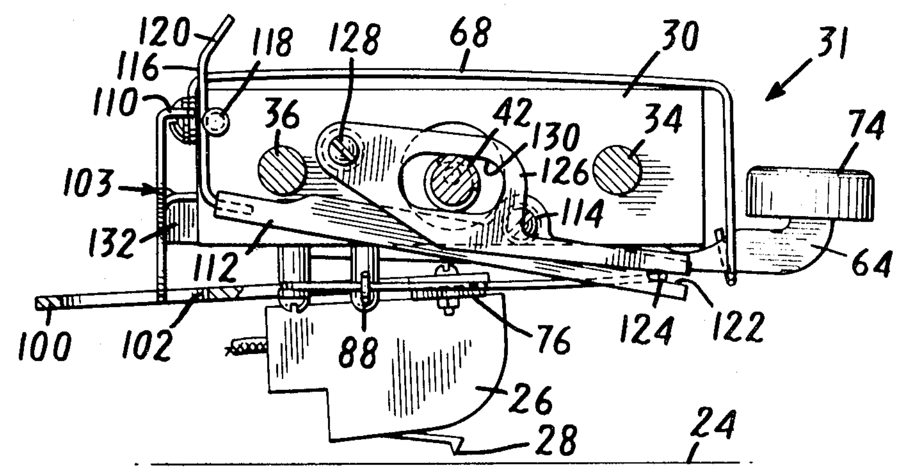
FIG. 8 is a cross-sectional view of a portion of the record player taken along the line 8—8 of FIG. 4, looking in the direction of the arrows.

Referring again to FIGS. 3 and 4, the sensing wire 124 is fastened to the carriage 30 for limited pivoting movement in response to lateral movement of the pickup pivot 80, the latter being coupled to the wire 124 by a coupling similar to the coupling 92. The free end of the sensing wire 124 lies just below the bottom of the carriage and is in alignment with the slot 122 in the arm 112 (FIGS. 4 and 8). As illustrated in solid lines in FIG. 4, when the pickup 26 is located centrally between the downwardly depending supports 86 and 88, the free end of the sensing wire 124 does not pass through the slot 122. When the pickup 26 is moved laterally towards the support 88, as occurs when the stylus tracks the widely spaced "-fast" grooves at the end of the record, the sensing wire 124 (as shown in phantom in FIG. 4) passes through the slot 122 into the path traversed by the oscillating free end of the Scotch yoke 126.

Accordingly, on the next downward movement of the Scotch yoke 126, the member 112 is actuated to lift the wire 116 upwardly to disengage the spring detent portion 110 from the carriage 30, and the spring vertex portion 108 depresses the arm 100 to raise the pickup stylus 28 from the record. The parts are then in the relative positions shown in FIG. 8.

The spring detent portion 110 may be reset, after it has been released, by a reset member 132 which is pivotally mounted on the carriage 30 at a point 134 inside the slot 70. The reset member 132 is also pivotally coupled to the split-nut arm 64 at 136 and has a cam surface 138 formed at the free end thereof which lies just below the straight spring portion 108 when in the released position (See FIGS. 5, 9 and 10).

When (by manual manipulation of the knob 74), the half-nut arm 64 is pivoted downwardly to a position where it is out of contact with the lead screw 42, the reset member 132 is actuated and the cam surface 138 on its free end lifts the spring at the straight portion 106 and engages the detent portion 110 on the top of the carriage 30. This allows the stylus 28 to drop to the surface of the record.

In operation, and assuming that the carriage assembly 31 is in the nonplaying position shown in dotted lines in FIGS. 1 and 2, but with the carriage 30 at the "start" location, a record 24 (FIGS. 1 and 2) is placed on the turntable 20; the knurled ring 60 is rotated counterclockwise to position the carriage 30 along a record radius, and the assembly 31 is lowered until the friction roller 44 rests on the record label and the stylus 28 is in a record groove at the start of the record.

The power is then turned on so that the turntable 20 rotates at normal speed and drives the lead screw 42. Preferably, the lead screw 42 is designed so that it tends to drive the carriage 30 slightly faster than the speed of the stylus 28 in the record groove. As a consequence, the pickup 26 tends to move towards the support 76 until the tip 98 of the sensing wire (FIG. 4) is moved to a position between the carriage 30 and the split-nut arm 64 and maintains the split-nut 62 out of engagement with the eccentric lead screw 42. This allows the stylus 28 to catch up, at which time the sensing wire is no longer able to maintain the split-nut 62 disengaged from the drive screw 28 so that the carriage 30 once again is driven by the latter.

In this manner, the carriage 30 is driven at the average speed of the stylus 28 in the record groove and the stylus 28 is always maintained substantially tangent to the record without exerting undue pressure on the sides of the record groove.

When the stylus 28 reaches the end of the record, it enters the widely spaced-apart "fast" grooves and thus is moved towards the center of the record at a speed substantially higher than that of the carriage 30. This causes the pickup 26 to move towards the support 88 (FIG. 8) until the sensing wire 124 enters the slot 122 and moves into the path of the Scotch yoke 126. At the next downward oscillation of the Scotch yoke 126, the releasing member 112 is actuated and moves the upright wire 116 to disengage the spring detent portion 110 from the top of carriage 30 (FIG. 8). The vertex spring portion 108 now depresses the arm to lift the pickup stylus 28 from the record. The carriage assembly 31 is then manually lifted from the record and rotated to the position shown in phantom in FIGS. 1 and 2 so that the record may be removed from the turntable.

The sensing wires 90 and 124 should, of course, be considerably more complaint than the stylus suspension so that the pickup may be able to move relatively to the carriage, even when a sensing wire is clamped. In a practical case, the sensing wire compliance might be, say, twenty times the compliance of the stylus suspension.

Also, the guide rods 34 and 36 on which the carriage 30 rides should be provided with heavy viscous lubrication, so that the carriage 30 will not lose its place when the half-nut 62 is out of engagement with the lead screw 42.

Figure 11:
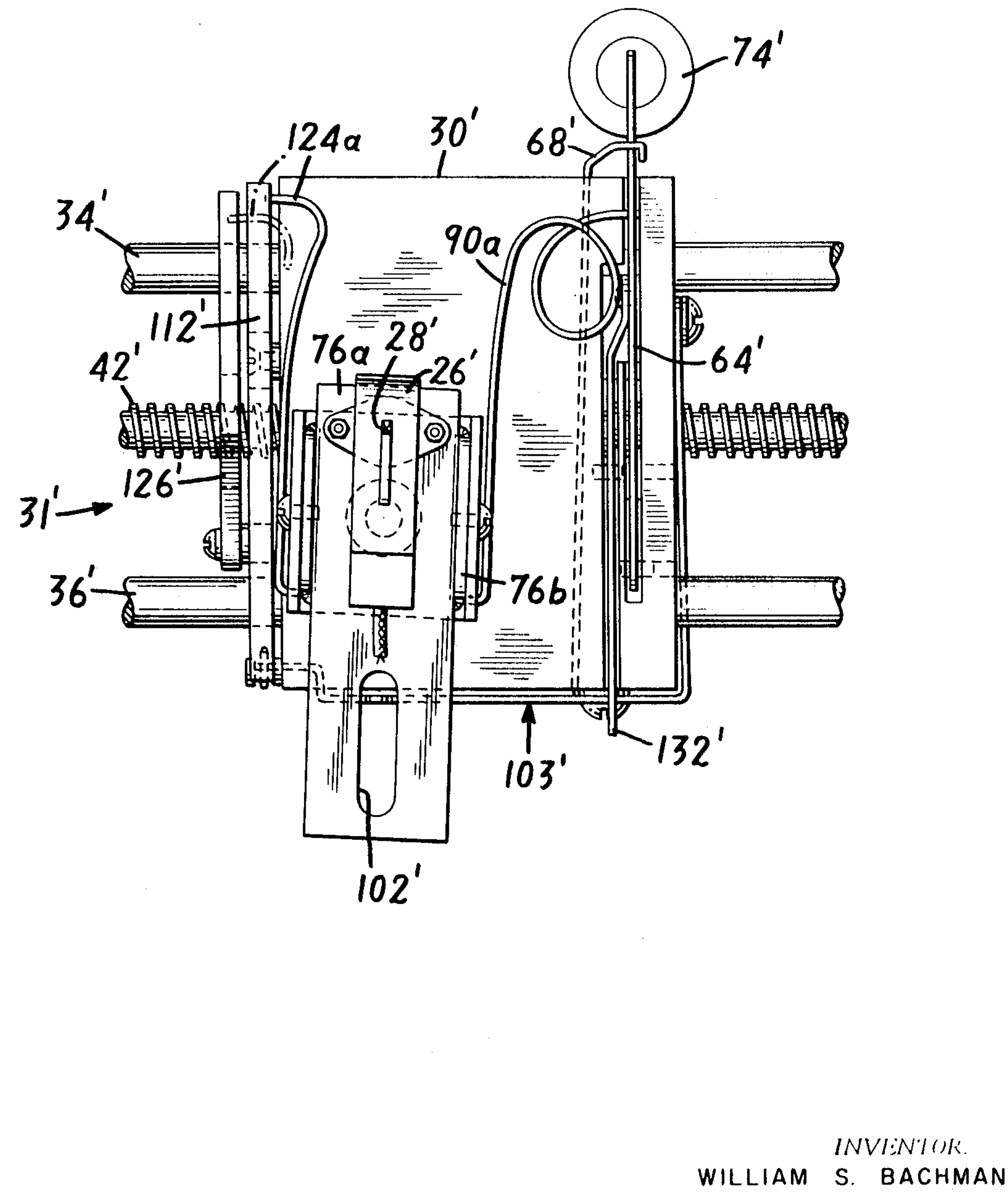
FIG. 11 is a bottom view of a modified form of reproducer according to the invention.

In the form of the invention shown in FIG. 11, the pickup is capable of limited rotation about both horizontal and vertical axes, but, contrary to conventional practice, is mounted directly on the carriage without a tone arm. Aside from this difference, the structure is similar to that described above and illustrated in FIGS. 1–10, inclusive. Accordingly like parts are designated by like primed reference characters.

As shown in FIG. 11, a pickup 26' is secured to a support member **76*a* which is pivotally mounted in a second support member 76*b* for rotation about a horizontal axis, the second member 76*b* being pivotally mounted on the carriage 30' for rotation about a vertical axis. Sensing wires 90*a* and 124*a* serving the same functions as the sensing wires 90 and 124 in FIG. 4 are secured to the support member 76*b* at the locations shown. Operation is basically the same as described above in connection with FIGS. 1–10**, inclusive, except that control of the drive and automatic lifting of the stylus from the record at the end of play are in response to angular deviation of the pickup from a reference position, usually at right angles to a record radius.

The invention thus provides novel and highly effective record player apparatus in which resonances of the type produced with a conventional tone arm and pickup are completely eliminated. Further, there is no undesirable bias on the stylus since it moves along a radius of the record tangent to the groove.

The above-described embodiment of the invention is merely exemplary and variations and modifications thereof may be made by those skilled in the art without departing from the spirit and scope of the invention. Accordingly, all such variations and modifications are intended to be within the scope of the invention as defined in the appended claims.

I claim:

1. In a reproducer for disc records and the like, the combination of a carriage, guide means supporting the carriage for translation in playback relation to a record, pickup means compliantly mounted on said carriage for movement relative thereto in the direction of translation of said carriage, means including an eccentric lead screw and a half-nut secured to said carriage and normally biased into engagement with said lead screw for translating said carriage along said guide means, and mechanical sensing means secured to said carriage responsive to a predetermined displacement of said pickup means relative to said carriage to disengage said half-nut from said lead screw at least during a portion of the rotation of said lead screw to allow said pickup means and said carriage to return to within said predetermined displacement.

2. A record reproducer as defined in claim 1 in which the pickup means has a stylus in a complaint suspension and is adapted to respond to groove modulation in a record, and the mechanical sensing means is compliantly mounted and has substantially greater compliance than said stylus suspension for sensing the spatial relation between said pickup means and said carriage.

3. A record reproducer as defined in claim 1 in which said sensing means, at said predetermined displacement of the pickup means relative to the carriage, is adapted to cooperate with a fixed member secured to the carriage and said half-nut to hold the latter out of engagement with the lead screw during said portion of the rotation of the lead screw at a predetermined position away from the axis of rotation of the lead screw, to discontinue translation of the carriage along the guide means.

4. A record reproducer as defined in claim 1 in which the eccentric lead screw is driven in rotation by a friction roller engaging the record surface on playback.

5. A record reproducer as defined in claim 3 in which said lead screw is driven by a friction roller secured thereto and adapted to engage the record surface on playback.

6. A record reproducer as defined in claim 1 in which the compliant mounting of the pickup means on the carriage is operative to provide limited rotation of the pickup means about an axis normal to the record surface.

7. A record reproducer as defined in claim 1 in which the pickup means has a stylus adopted to respond to groove modulation in record and is mounted on pivot means secured to said carriage and arranged to provide movement of the pickup means relative to the carriage in the direction of translation of the carriage and limited rotation of the pickup means to lift the stylus from the record surface.

8. A record reproducer as defined in claim 7 further including an arm secured to the pickup means, releasable means for actuating said arm to rotate said pickup means about the pivot means to lift the stylus from the record, and means responsive to the stylus engaging widely spaced grooves in the record for releasing said releasable means.

9. A record reproducer as defined in claim 8 in which the arm-actuating means comprises spring means having an arm-actuating portion and a detent portion adapted to cooperate with the carriage to keep said spring arm-actuating portion out of engagement with the arm on the pickup means, a member mounted on the carriage and actuatable to release said spring detent portion, and means responsive to predetermined relative displacement between the pickup means and the carriage for actuating said actuatable member.

10. A record reproducer as defined in claim 9 together with a manually operable member on the carriage for disabling said carriage-translating means and resetting said spring detent portion to keep said spring arm-actuating portion out of engagement with the arm on the pickup means.

* * * * *